(12) United States Patent
Wilson (10) Patent No.: US 9,937,746 B2
(45) Date of Patent: Apr. 10, 2018

(54) CAPPED WHEEL FASTENER AND METHOD OF ASSEMBLY (71) Applicant: Maclean-Fogg Company, Mundelein, IL (US)

(72) Inventor: Larry J. Wilson, Commerce Township, MI (US)

(73) Assignee: MacLean Fogg Company, Mundelein, IL (US)

( * ) Notice: Subject to any disclaimer, the term of this patent is extended or adjusted under 35 U.S.C. 154(b) by 9 days.

(21) Appl. No.: 15/144,920

(22) Filed: May 3, 2016

(65) Prior Publication Data

US 2017/0320356 A1 Nov. 9, 2017

(51) Int. Cl.
B60B 7/02 (2006.01)
B60B 3/14 (2006.01)
F16B 37/14 (2006.01)

(52) U.S. Cl.
CPC .......... B60B 7/02 (2013.01); B60B 3/14 (2013.01); F16B 37/14 (2013.01); B60B 2320/10 (2013.01); B60B 2900/572 (2013.01)

(58) Field of Classification Search
CPC ....... B60B 7/02; B60B 3/14; B60B 2900/572; B60B 2320/10; F16B 37/14
USPC ............ 301/37.372, 37.374, 37.375, 37.376; 411/429, 430, 375, 376
See application file for complete search history.

(56) References Cited

U.S. PATENT DOCUMENTS

| 5,772,377 A * | 6/1998 | Bydalek ............ B60B 7/00 411/375 |
| 9,593,707 B2 * | 3/2017 | Weis ............ B60B 3/16 |
| 2003/0068212 A1 * | 4/2003 | Wilson ............ F16B 37/14 411/429 |

FOREIGN PATENT DOCUMENTS

EP 3106683 A1 * 12/2016 ............ B60B 3/165

* cited by examiner

Primary Examiner — S. Joseph Morano
Assistant Examiner — Jean Charleston
(74) Attorney, Agent, or Firm — Brinks Gilson & Lione (57) ABSTRACT A capped fastener is provided with deflected projections on the nut body for securing a cap on the nut body. The deflected projections fit within a double walled edge of the cap. The projections are deflected through a simple method during the assembly process.

16 Claims, 7 Drawing Sheets

6 PROJECTIONS CENTERED OPPOSITE EACH FLAT

.02 REF.

CAPPED WHEEL FASTENER AND METHOD OF ASSEMBLY

BACKGROUND

The present disclosure relates generally to fasteners, and more particularly, to fasteners with decorative caps.

Fasteners are used in numerous applications to attach various components together. Typically, a fastener has at least a threaded portion and one or more wrenching surfaces thereon. The wrenching surfaces are designed to receive torque from a tool, such as a socket or other wrench, which is used to tighten or loosen the fastener. In a conventional fastener, such as a nut, the fastener may have internal threads and six wrenching surfaces oriented in a hexagonal shape around the internal threads. However, other fasteners may have external threads, such as bolts and screws. Fasteners may also have a different number of wrenching surfaces as desired.

Decorative wheel fasteners have become an important part of wheel aesthetics in automotive styling. In particular, many automotive consumers are drawn to the aesthetics of an automobile's wheels, since this is often a distinctive part of an automobile. As a result, the wheel nuts become an integral component of the aesthetics of the wheel, and the automobile more generally, since the wheel nuts form a highly visible pattern around the center of the wheel. However, automotive wheel nuts are highly susceptible to corrosion problems due to the wet and salty environment that is often encountered by the wheels of a vehicle. Naturally, corrosion on the visible surfaces of a wheel nut greatly diminishes the aesthetic appearance of the wheel and the automobile generally.

One approach that has been highly successful in addressing wheel nut aesthetics is stainless steel capped wheel nuts. In this solution, a nut body is capped with a stainless steel covering. Since stainless steel is resistant to corrosion, highly durable and visually attractive, stainless steel capped wheel nuts have been capable of addressing a large portion of the demand for aesthetically pleasing wheel nuts. Another advantage of stainless steel capped wheel nuts is that the color of stainless steel, a shiny silverish color, generally matches the color used for most automobile wheels.

To meet ever increasing global demands for energy efficiency, automobile manufacturers have challenged suppliers to reduce mass in components, such as wheel nuts. The inventor believes the design of capped fasteners can be improved to lower weight and simplify assembly, while maintaining the highest industry standards for durability, function, and aesthetics.

BRIEF SUMMARY

A fastener for a vehicle wheel with a fastener body comprising a thread encircling an axis of the fastener body, a top portion with a plurality of wrenching surfaces disposed around the top portion, a bottom portion with a circular cross-section located below the top portion, wherein the bottom portion extends radially beyond the top portion and forms a shelf at the intersection of the top portion and the bottom portion; and a plurality of projections disposed on the shelf, wherein the plurality of projections extend radially outward beyond the circular cross-section of the bottom portion; and a cap comprising a wall, the cap disposed over the top portion of the fastener body and partially disposed over the bottom portion of the fastener body, a section of the cap disposed over the bottom portion including a double wall, wherein the double wall section of the cap is located adjacent to the plurality of projections.

A method of assembling a cap onto a fastener body, the fastener body comprising a thread encircling an axis of the fastener body, a top portion with a plurality of wrenching surfaces disposed around the top portion, a bottom portion with a circular cross-section located below the top portion, wherein the bottom portion extends radially beyond the top portion and forms a shelf at the intersection of the top portion and the bottom portion, a plurality of projections disposed on the shelf, wherein the plurality of projections extend axially toward the top portion, the cap comprising a wall with an edge having a double wall section, the method having the steps of placing the top portion of the fastener body in the cap, pressing the bottom portion of the fastener body toward the cap such that the plurality of projections are adjacent to the double wall section of the cap, and deflecting the plurality of projections radially outward beyond the circular cross-section of the bottom portion of the fastener body.

BRIEF DESCRIPTION OF THE DRAWINGS

The invention may be more fully understood by reading the following description in conjunction with the drawings, in which.

DETAILED DESCRIPTION

Referring now to the figures, FIG. 1 shows an embodiment of a capped fastener in the form of automotive wheel nut 100. While it is envisioned that the improved capped fastener may be particularly useful as an automotive wheel nut 100, it is also possible that the capped fastener may be useful in other applications as well. Wheel nut 100 includes a nut body 112 and cap 114.

The body 112 includes a threaded portion 116 which in this embodiment defines a female thread. The threaded portion 116 is centered about a longitudinal axis A. Extending radially outwardly from the threaded portion 116 is a load-bearing surface 118. In this embodiment the load-bearing surface 118 is oriented at an angle to the axis A. The load bearing surface may be varied to fit the needs of the wheel nut 100, for example, matching the shape of a cavity in a wheel containing the wheel nut 100. The body 112 also includes an out-of-round surface 120 which in this embodiment is hexagonal in shape, and which defines a set of six wrench flats designed to accept torque from a tool such a lug-wrench. The body 112 also includes a base 122 located below the out-of-round surface 120. The base 122 includes the load-bearing surface 118. The base 122 extends radially outward from the axis A further than the out-of-round surface 120. The body 112 also includes a cylindrical core 124 extending axially through it from the base 122 on one end to the out-of-round surface 120 on the other end. The lower portion of the core 124 includes the threaded portion 116.

The intersection of the base 122 and the out-of-round surface 120 creates a shelf 126. A projection 128 extends radially outward from the shelf 126. The projection 128 extends radially outward further than the base 122. The radial extension of projection 128 may be the result of deflecting the projection 128 outward, as will be explained below. The projection 128 may extend axially upward toward the out-of-round surface 120. The projection 128 may be one of several projections 128, as will be explained below.

The cap 114 is shaped generally to conform to the out-of-round surface 120 and the base 122. The cap 114 may cover the out-of-round surface 120 and may partially cover the base 122. The cap 114 also defines six wrench flats 130 arranged in a hexagonal pattern, as shown in FIG. 1B. The cap 114 includes a free edge 132. Edge 132 may include a double thickness of the cap wall material. The double thickness of edge 132 may be created by folding the cap wall material inward into the cap cavity, as show in FIG. 1A. The inside diameter of the cap at edge 132 may be smaller than the outside diameter of the base 122, which may create an interference fit between the cap 114 and the nut body 112. The interference fit may help reduce rotation of the cap 114 relative to the nut body 112.

Figure 1A:
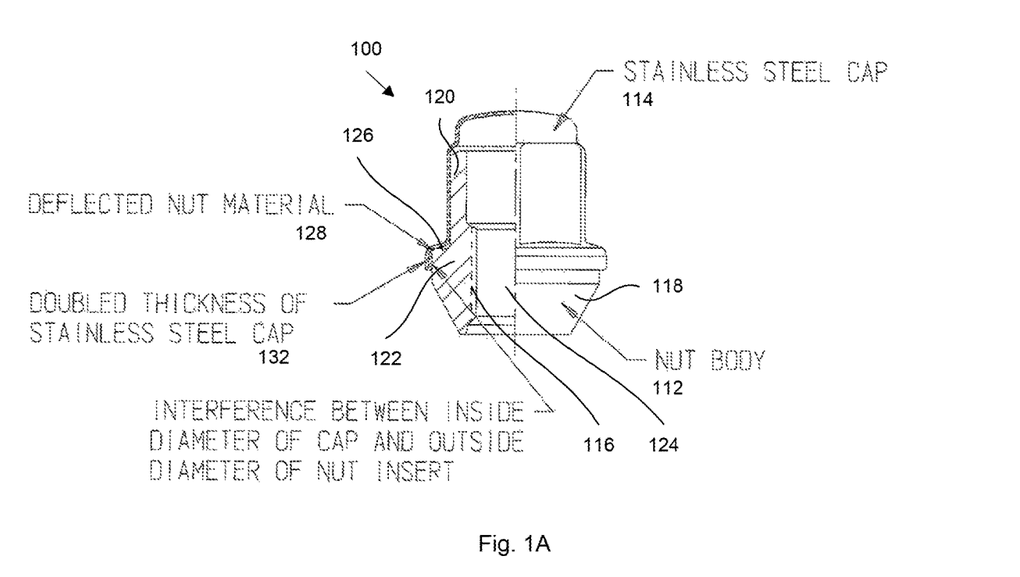
FIG. 1 is a cross-sectional side view and a top view of an embodiment of a capped fastener.
Figure 1B:
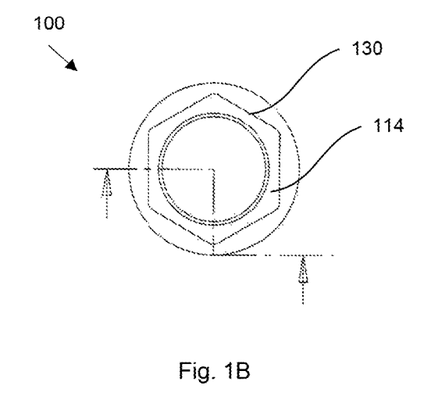

The double wall thickness edge 132 may be located below the projection 128 such that the projection 128 may be predominately in contact with a single wall thickness portion of the cap 114, as shown in FIG. 1A. In order to remove the cap 114 from the nut body 112 in an axial direction, edge 132 may need to be moved over the projection 128. The outside diameter of the base 122 at the projection 128 may be larger than the inside diameter of the cap 114 at the edge 132. The projection 128 and the double wall thickness of edge 132 may interact to help axially retain the cap 114 on the nut body 112.

Utilizing the projection 128 to axially retain the cap 114 on the nut body 112 rather than including a radial flange on the nut body to retain the cap 114 will reduce the mass of the wheel nut 100 by eliminating the flange material. As a result, the overall weight of the wheel nut 100 may be reduced. A potential weight savings may be significant for several reasons. Specifically, with respect to automotive wheel nuts 100, the weight of the wheel nut 100 is more critical than other components because the wheel nut 100 is attached directly to the wheel. Because the wheel is located below the suspension system of the vehicle (i.e., between the road and the suspension system), this weight is often referred to as "unsprung weight." In general, it is preferred by automobile manufacturers to reduce the unsprung weight of a vehicle in order to improve handling performance of a vehicle. In addition, since wheel nuts 100 rotate with the wheel, the weight of the wheel nuts 100 also has a greater impact on acceleration and deceleration performance of a vehicle. Thus, the weight of an automobile wheel nut 100 can have a disproportionate impact on the performance of a vehicle. In addition, reducing the weight of a wheel nut 100 can reduce the cost of the automobile by reducing material costs. This can also be significant due to the quantity of wheel nuts 100 that are used on a typical automobile. For example, many vehicles use five wheel nuts 100 on each wheel and have four wheels on a vehicle, which means a total of twenty wheel nuts 100 are required for each vehicle. Additionally, utilizing the projection 128, rather than a flange, to retain the cap 114 on the nut body 112 will reduce the overall diameter of the wheel nut 100. Reducing the overall diameter of the wheel nut 100 may improve the design of a wheel the wheel nut 100 is attached to by requiring a smaller cavity to house the wheel nut 100. A smaller cavity may improve the strength and/or aesthetics of the wheel.

Figures 2, 2A, 2B, 2C:
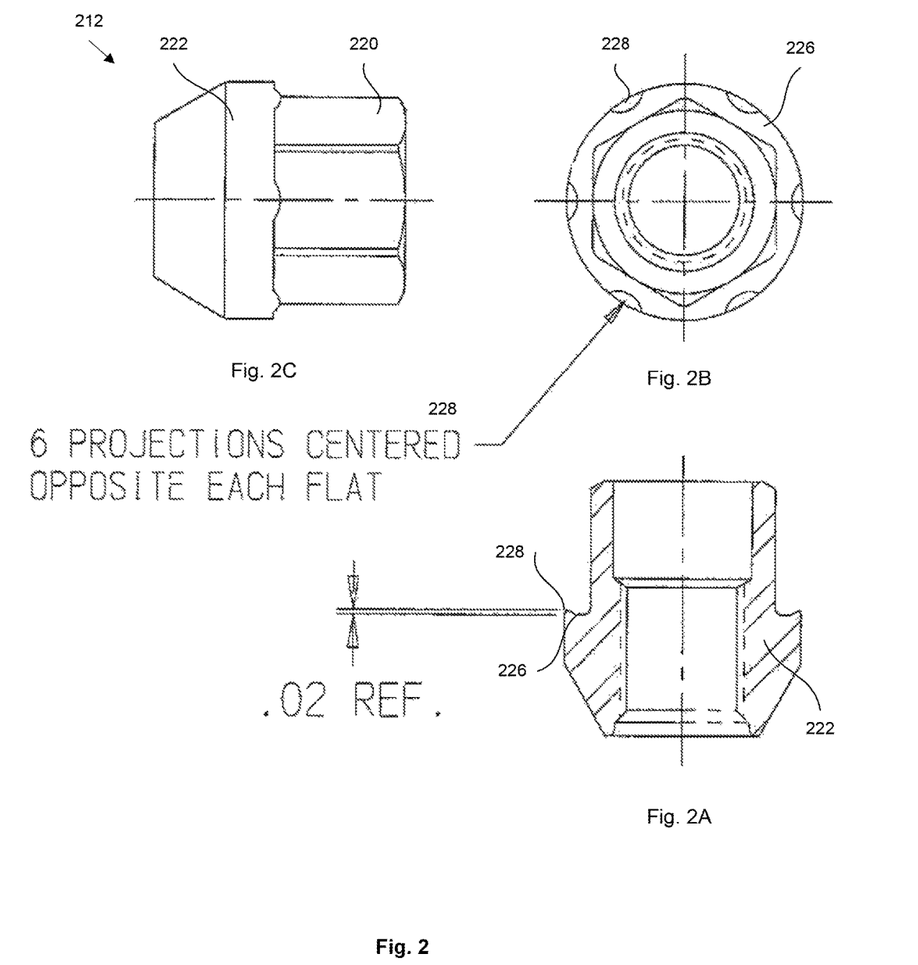
FIG. 2 is a cross-sectional side view, a side view, and a top view of an embodiment of a nut body.

FIG. 2 shows several views of an embodiment of the nut body 212. In this embodiment there are six projections 228 on the shelf 226. The number of projections 228 may be varied to suite the application. A larger number of projections may more securely hold cap 114 on the nut body 212, but may also increase the mass of the wheel nut 100 and may require more force to deflect the projections. Conversely, a smaller number of projections may decrease the mass of the wheel nut 100 and may require less force to deflect the projections, but may not secure the cap 114 on the nut body 212 as well.

Nut body 212 may depict a nut body 212 before the projections 228 are deflected radially outward (as shown in FIG. 1). Because the projections 228 have not yet been deflected radially outward, the projections 228 may only extend axially upward toward the out-of-round surface 220. The height of the projections 228 may extend axially upward approximately 0.02 inches. The height of the projections 228 may include extra material to account for variation in the material during the nut body 212 formation process, such as cold forming.

The height of the projections in their undeflected state may vary depending on the application. For example, extra height may result in additional material projecting radially outward after the projections 228 are deflected, which may result in a larger outside diameter of the base 222 at the projections 228. A larger outside diameter of the base 222 at the projections 228 may better secure the cap 114 on the nut body 112. Additional force may be required to deflect the additional material of the projections 228.

The projections 228 may be located at the outer radial edge of the shelf 226. The projections 228 may be shaped such that they tend to deflect outward as the projections 228 are pressed downward during an assembly process. The projections 228 may take a partial hemispherical shape with a generally flat side located at the outer radial edge of the shelf 226, as best shown in FIG. 2B. The projections 228 may slope axially downward and inward from the radial edge of shelf 226. The projections 228 may have a flat surface on the downward slope. The projections 228 may form an acute angle with the outer vertical edge of the base 222, as shown in FIG. 2A. The angle may be varied in order to affect how far radially outward the projections 228 deflect and to affect how much force is required to deflect the projections 228. For example, a larger angle may provide more material to deflect than a smaller angle, but a larger angle may require more force to deflect the material. Conversely, a smaller angle may provide less material to deflect but may require less force to deflect the material. The angle may help predispose the projections 228 to deflect outwards.

The projections 228 may be centered opposite each of the six wrench flats on the out-of-round surface 220. Locating the projection 228 opposite the wrench flat may ease formation of the projection 228 by creating a surface to grip while forming the projections.

Figure 3A:
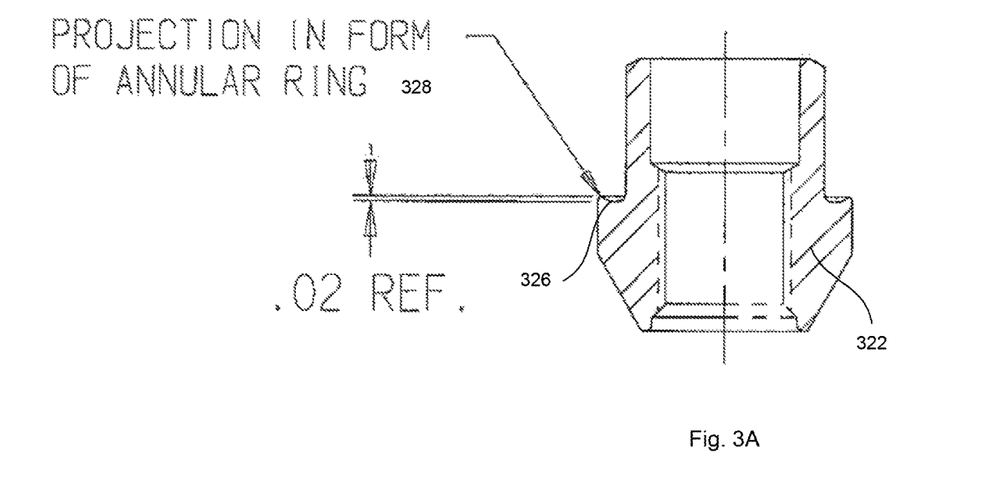
FIG. 3 is a cross-sectional side view, a side view, and a top view of another embodiment of a nut body.
Figure 3B:
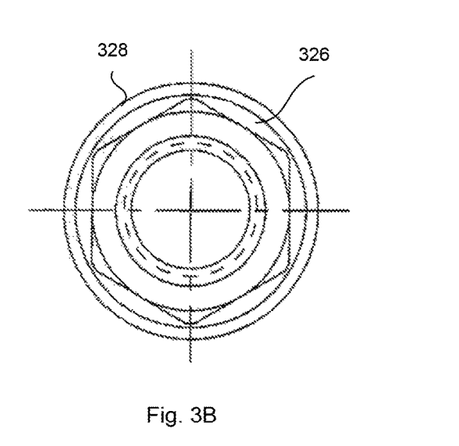
Figure 3C:
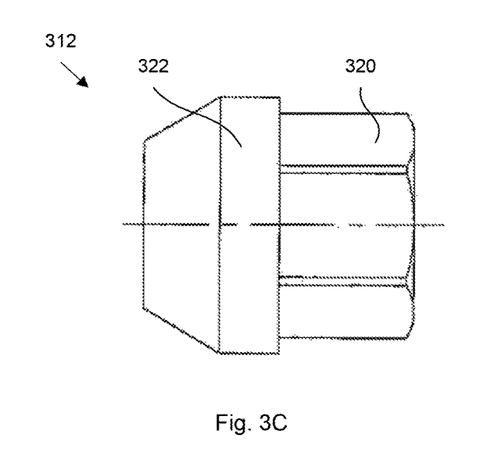

FIG. 3 shows several views of another embodiment of the nut body 312. In this embodiment the projection 328 forms an annular ring formed on the shelf 326. Nut body 312 may depict a nut body 312 before the ring projection 328 is deflected radially outward (as shown in FIG. 1). Because the ring projection 328 has not yet been deflected radially outward, the ring projection 328 may only extend axially upward toward the out-of-round surface 320.

The ring projection 328 extends around the entire outer edge of shelf 326. After it is deflected, the ring projection 328 may more securely hold cap 114 on the nut body 312 than other embodiments of the projections. The ring projection 328 may require more force to deflect the ring projection 328 radially outward than other embodiments of the projections. Similar to projections 228, the ring projection 328 may vary in axial height and may vary its angle or shape to affect how the ring projection 328 deflects outward.

Figure 4A:
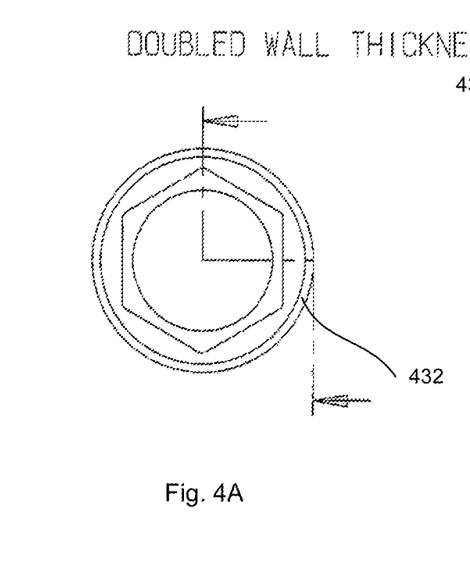
FIG. 4 is a bottom view, a side view, and a top view of an embodiment of a cap.
Figure 4B:
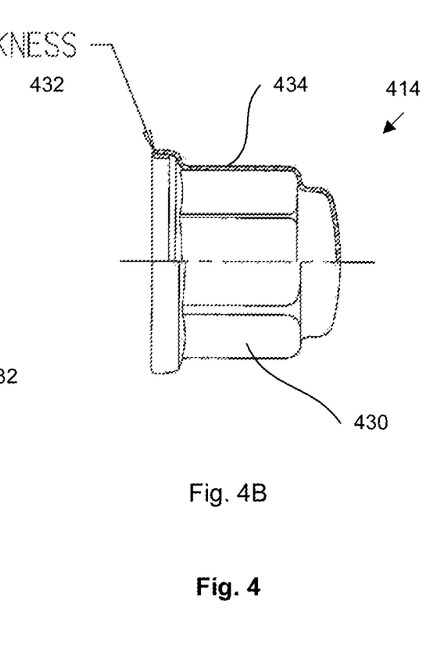
Figure 4C:
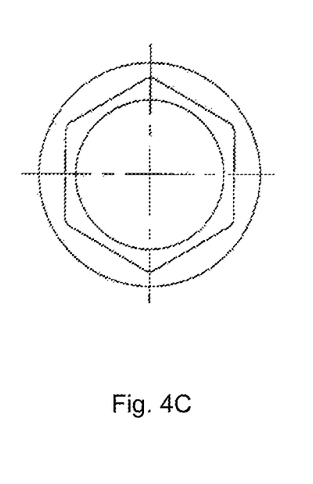

FIG. 4 shows several views of an embodiment of a cap 414. Cap 414 includes wall 434 that generally conforms to the shape out-of-round surface 120 and the base 122 of nut body 112. Cap 414 may also include a dome-shaped end wall. The dimensions and configuration of the cap 414 are such that it slips easily over the nut body 112.

Cap 414 includes an edge 432 that may include a double thickness of the cap wall material, as shown in FIG. 4B. The double thickness of edge 432 may be created by folding the cap wall material inward into the cap cavity, as show in FIG. 4B. Alternatively, edge 432 may be created by folding the cap wall material outward away from the cap cavity.

The cap 414 must be of sufficient robustness to withstand typical torque used to tighten and loosen automotive wheel nuts 100 without substantially damaging the cap 414. Typically, the cap 414 is made from metal, and in the case of automobile wheel nuts 100, stainless steel is preferred for the cap 414. If desired, the cap 414 may be pressed onto the nut body 112, may be welded to the nut body 112, or may be adhered to the nut body 112 with adhesives in order to increase the durability of the cap 414 during tightening and loosening of the wheel nut 100. However, it may be possible that an interference fit between the cap 414 and the nut body 112 may be sufficient to maintain the desired durability of the cap 414.

Figure 5A:
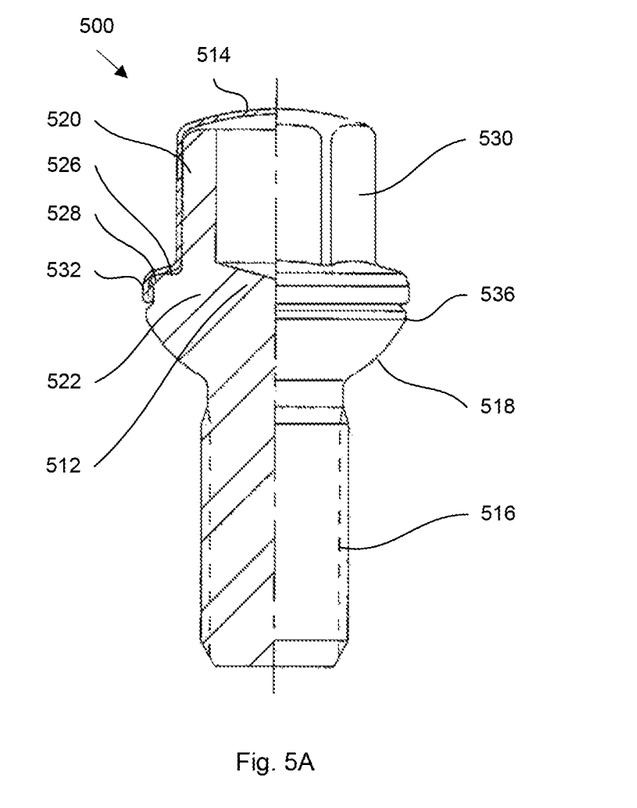
FIG. 5 is a cross-sectional side view and a top view of another embodiment of a capped fastener.
Figure 5B:
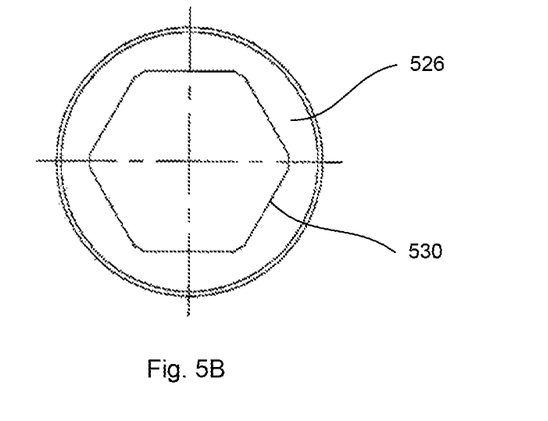

FIG. 5 shows several views of another embodiment of a fastener, namely wheel bolt 500. Wheel bolt 500 is similar in many ways to wheel nut 100 described above. However, in this embodiment the capped fastener is a wheel bolt and the threaded portion 516 defines a male thread rather than a female thread. Wheel bolt 500 includes a bolt body 512 and cap 514, with the same features as previous embodiments. The cap 514 is axially retained in the same manner as in the embodiments of FIGS. 1-4. Bolt body 512 may include multiple projections 528 on shelf 526 or may include a single ring projection 528 on shelf 526, as described in reference to the previous embodiments. Bolt body 512 may include a bolt flange 536 that extends radially beyond the remainder of bolt body 512 such that the load-bearing surface 518 is separated from the cap 514.

Figure 6A:
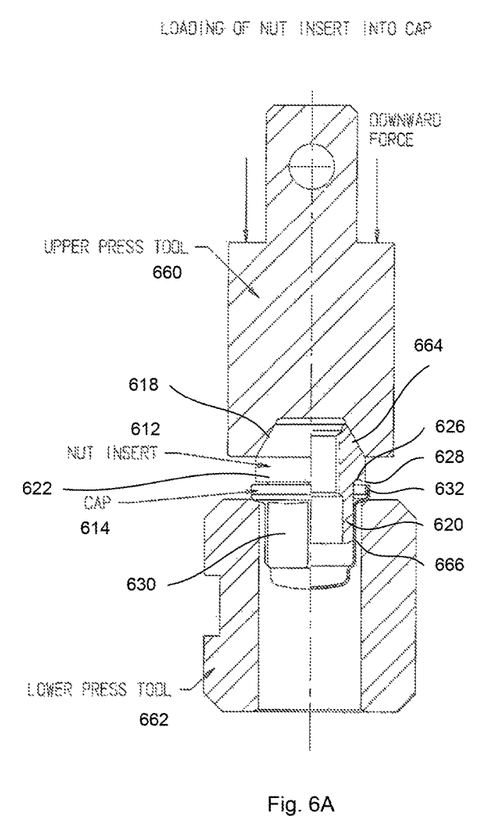
FIG. 6 is a cross-section view of an embodiment of a capped fastener during an assembly process.

FIG. 6 shows the assembly of a wheel nut 610 by inserting nut body 612 into cap 614 in a mechanical press. The press comprises a movable upper press tool 660 and a fixed lower press tool 662. The cap 614 is seated in a well 666 in the lower press tool 662, as shown in FIG. 6A. The well 666 is shaped similarly to the cap 614 such that the cap 614 will not deform under pressure from the upper press tool 660. It may be desirable for the well 666 to have an internal shape for receiving the wrenching surfaces to provide additional support to the cap 614. The pressure from the upper press tool 660 will be transferred through the cap 614 and received by the lower press tool 662 without damaging the cap 614.

The nut body 612 is loaded into the cap 614 upside down such that the out-of-round surface 620 is within the cap 614, as shown in FIG. 6A. The nut body 612 may be held in the cap 614 by gravity. The upper press tool 660 applies a downward force to the base 622 of the nut body 612 and moves the nut body 612 further into the cap 614. The downward force may be sufficient to overcome the interference fit between the double wall edge 632 portion of the cap and the base 622 such that the base 622 enters the cap 614.

The projections 628 begin to deflect outward as the projections 628 impact the cap 614 as it is supported by the lower press tool 662. Deflection of the projections 628 continues as the upper press tool 660 continues to apply force to the nut body 612. The amount of force required to deflect the projections 628 outward may vary depending on several factors, including the axial height of the projections 628 before deflection, the shape and angle of the projections 628, the number of projections 628, and the desired amount of deflection. The amount of force required may be in the range of 5,000 pounds to 30,000 pounds, with the lower end of the range applying to projections such as those shown in FIG. 2 and the higher end of the range applying to projections such as those shown in FIG. 3.

Figure 6B:
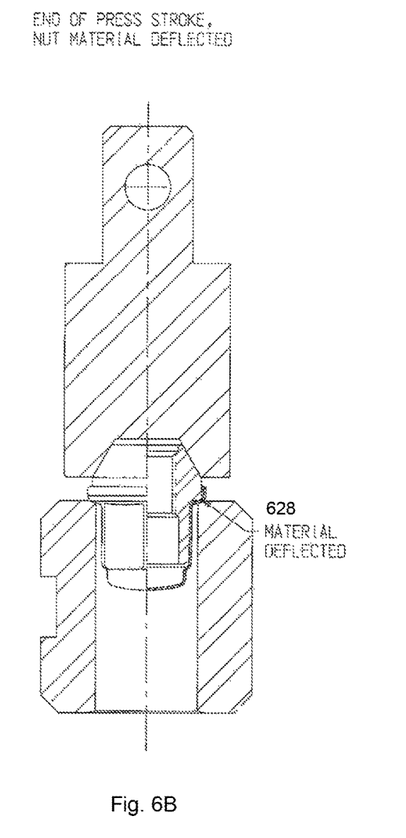

The deflection of the projections 628 stops when the downward force ceases at the end of the press stroke, as shown in FIG. 6B. The deflected projections 628 may be predominately located axially further in the cap 614 than the double wall edge 632 of the cap 614. The deflected projections 628 may extend radially further outward than the remainder of base 622 of the nut body 612. The projections 628 and the double wall thickness of edge 632 may interact to help axially retain the cap 614 on the nut body 612.

The method of securing the nut body 612 in the cap 614 by deflecting the projections 628 through downward force is a relatively simple method requiring relatively simple equipment, as compared to conventional methods. Further, the amount of force required to secure the nut body 612 in the cap 614 may be less than conventional methods.

Figure 7:
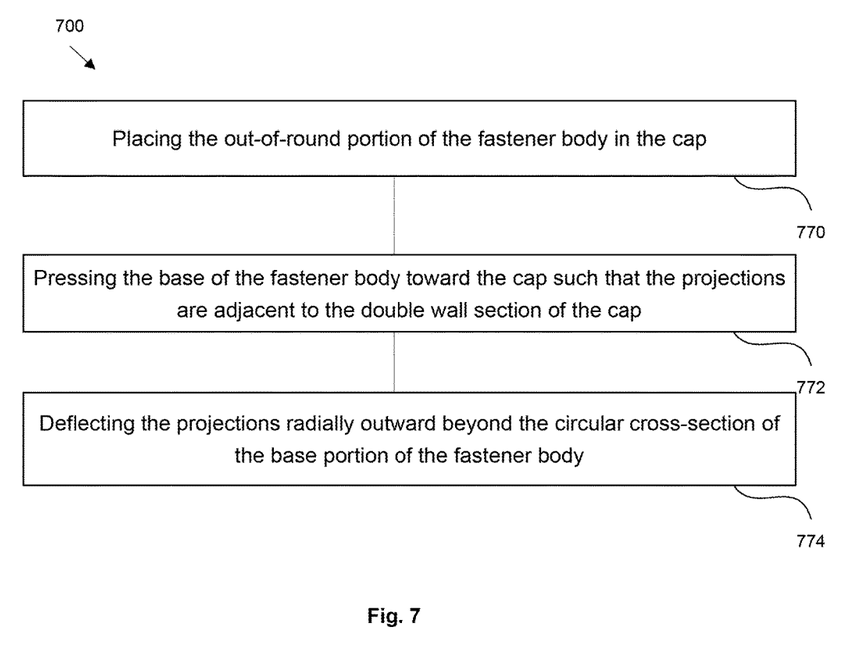
FIG. 7 is a method of assembling an embodiment of a capped fastener.

FIG. 7 shows a method of assembling a capped wheel fastener according to an embodiment of the invention. Step 770 begins by placing the out-of-round portion of the fastener body within the cap. In step 772 the base of the fastener body is pressed toward the cap such that projections on the nut body move into the cap and are located adjacent to the double wall section of the cap. The projections may be located further within the cap than the double wall section of the cap. In step 774 the projections on the fastener body are deflected radially outward beyond the remainder of the base portion of the fastener body.

While several embodiments of the capped fastener have been described, it should be understood that the capped fasteners are not so limited, and modifications may be made without departing from the disclosures herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the capped fastener, and it is not necessarily expected that all of the described advantages will be achieved with every embodiment of the capped fasteners. The scope of the disclosure is defined by the appended claims, and all devices and methods that come within the meaning of the claims, either literally or by equivalence, are intended to be embraced therein.

The invention claimed is:

1. A fastener for a vehicle wheel, comprising:
a fastener body comprising a thread encircling an axis of the fastener body, a top portion with a plurality of wrenching surfaces disposed around the top portion, a bottom portion with a circular cross-section located below the top portion, wherein the bottom portion extends radially beyond the top portion and forms a shelf at the intersection of the top portion and the bottom portion, a plurality of projections disposed on the shelf, wherein the plurality of projections extend radially outward beyond the circular cross-section of the bottom portion;

a cap comprising a wall, the cap disposed over the top portion of the fastener body and partially disposed over the bottom portion of the fastener body, a section of the cap disposed over the bottom portion including a double wall, wherein the double wall section of the cap is located adjacent to the plurality of projections.

2. The fastener of claim 1, wherein the plurality of projections were deflected outward beyond the circular cross-section of the bottom portion during assembly of the fastener.

3. The fastener of claim 1, wherein the plurality of projections are located within the cap beyond the double wall section of the cap in an axial direction.

4. The fastener of claim 1, wherein the double wall section of the cap is not disposed over the top portion of the fastener body.

5. The fastener of claim 1, wherein the double wall section of the cap is not disposed over the plurality of projections.

6. The fastener of claim 1, wherein a single wall section of the cap immediately adjacent to the double wall section of the cap is in contact with the plurality of projections.

7. The fastener of claim 1, wherein the location of the double wall section of the cap below the plurality of projections prevents the cap from being removed from the fastener body.

8. The fastener of claim 1, wherein the double wall section of the cap below the plurality of projections prevents the cap from slipping off the fastener body when a wrenching force is applied to the plurality of wrenching surfaces.

9. The fastener of claim 1, wherein the plurality of wrenching surfaces comprise a plurality of flat surfaces, wherein the plurality of projections are located opposite the plurality of flat surfaces.

10. The fastener of claim 1, wherein the plurality of projections are located at the outer radial edge of the shelf.

11. The fastener of claim 1, wherein each of the plurality of projections slope axially downward and radially inward from an outer edge of the bottom portion.

12. The fastener of claim 1, wherein each of the plurality of projections form an acute angle with an outer edge of the circular cross-section of the bottom portion.

13. The fastener of claim 1, wherein the plurality of projections form a single projection in the shape of an annular ring.

14. The fastener of claim 1, wherein the double wall section of the cap has a predetermined inside diameter and the bottom portion of the fastener body has a predetermined outside diameter, wherein the predetermined inside diameter of the double wall section of the cap is less than the predetermined outside diameter of the bottom portion of the fastener body forming an interference fit between the cap and the fastener body.

15. The fastener of claim 1, wherein the fastener body comprises a tapered nose spaced apart from the top portion, the tapered nose being uncovered by the cap.

16. The fastener of claim 1, wherein the plurality of projections extend axially toward the top portion of the fastener body.

* * * * *